US010363545B2

(12) United States Patent
Nomura et al.

(10) Patent No.: US 10,363,545 B2
(45) Date of Patent: Jul. 30, 2019

(54) POROUS COORDINATION POLYMER AND HYDROGEN MOLECULE STORAGE METHOD, HYDROGEN STORAGE DEVICE, HYDROGEN MOLECULE SEPARATION METHOD AND HYDROGEN PURIFIER USING THE SAME

(71) Applicant: Panasonic Intellectual Property Management Co., Ltd., Osaka (JP)

(72) Inventors: Takaiki Nomura, Osaka (JP); Hideki Hata, Osaka (JP); Motomasa Yonezumi, Osaka (JP); Kazuhito Hato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 128 days.

(21) Appl. No.: 15/452,920

(22) Filed: Mar. 8, 2017

(65) Prior Publication Data
US 2017/0312733 A1 Nov. 2, 2017

(30) Foreign Application Priority Data

Apr. 27, 2016 (JP) .................. 2016-088773

(51) Int. Cl.
*B01J 20/22* (2006.01)
*B01D 53/04* (2006.01)
(Continued)

(52) U.S. Cl.
CPC ........ *B01J 20/226* (2013.01); *B01D 53/0407* (2013.01); *B01J 20/28011* (2013.01);
(Continued)

(58) Field of Classification Search
CPC ..... B01J 20/226; B01J 20/28011; C01B 3/20; C01B 3/0015; B01D 53/0407;
(Continued)

(56) References Cited

U.S. PATENT DOCUMENTS

2003/0148165 A1  8/2003  Muller et al.
2004/0265670 A1  12/2004 Muller et al.
2009/0133576 A1* 5/2009  Schubert ............... F17C 11/005
                                                                95/116

FOREIGN PATENT DOCUMENTS

JP   2005-525218   8/2005
JP   2013-040119   2/2013

OTHER PUBLICATIONS

Toni et al. "How Can a Hydrophobic MOF be Water-Unstable? Insightinto the Hydration Mechanism of IRMOFs" ChemPhysChem 2012 No. 13 pp. 3497-3503 (Year: 2012).*

(Continued)

*Primary Examiner* — Stephen Hobson
(74) *Attorney, Agent, or Firm* — McDermott Will & Emery LLP

(57) ABSTRACT

The present invention provides a porous coordination polymer, wherein the porous coordination polymer is formed of unit lattices; each of the unit lattices has a shape of a cube having eight vertexes and twelve sides; each of the vertexes of the unit lattices consists of a $Zn_4O$ cluster; each of the sides of the unit lattices consists of a $^-OOC-C\equiv C-COO^-$ group. At least a part of the unit lattices contains at least one hydrogen molecule only, or the inside of at least a part of the unit lattices is empty. The present invention provides a novel porous coordination polymer, especially, a porous coordination polymer suitable for separating hydrogen molecules from a gaseous mixture of the hydrogen molecules and (Continued)

impurity molecules (e.g., nitrogen molecules, oxygen molecules, or carbon dioxide molecules).

8 Claims, 13 Drawing Sheets

(51) Int. Cl.
 *C01B 3/00* (2006.01)
 *B01J 20/28* (2006.01)
 *C01B 3/50* (2006.01)
 *F17C 11/00* (2006.01)

(52) U.S. Cl.
 CPC .............. *C01B 3/0015* (2013.01); *C01B 3/50* (2013.01); *B01D 2253/204* (2013.01); *B01D 2256/16* (2013.01); *B01D 2257/108* (2013.01); *B01D 2259/4525* (2013.01); *F17C 11/00* (2013.01); *Y02C 10/08* (2013.01); *Y02E 60/328* (2013.01); *Y10S 420/90* (2013.01)

(58) Field of Classification Search
 CPC ........ B01D 2259/4525; B01D 2256/16; B01D 2253/204; B01D 2257/108; Y02E 60/328; Y10S 420/90; F17C 11/00; Y02C 10/08
 See application file for complete search history.

(56) References Cited

OTHER PUBLICATIONS

David J. Tranchemontagne et al., "Room temperature synthesis of metal-organic frameworks: MOF-5, MOF-74, MOF-177, MOF-199, and IRMOF-0", Tetrahedron 64, pp. 8553-8557, Jun. 2008.

Jie Yang, "Hydrogen storage in Metal Organic Frameworks", Master of Science in Chemistry, Xiaan Normal University, Xi'an, China, Oct. 2012.

The Extended European Search Report dated Oct. 2, 2017 for the related European Patent Application No. 171610363.

Marta De Toni et al: "How Can a Hydrophobic MOF be Water-Unstable? Insight into the Hydration Mechanism of IRMOFs", Chemphyschem—A European Journal of Chemical Physics & Physicalchemistry., vol. 13, No. 15, Jul. 20, 2012 (Jul. 20, 2012), pp. 3497-3503, XP055408568.

David Fairen-Jimenez et al: "Unusual Adsorption Behavior on Metal-Organic Frameworks", Langmuir, vol. 26, No. 18, Sep. 21, 2010 (Sep. 21, 2010), pp. 14694-14699, XP055408572.

* cited by examiner

POROUS COORDINATION POLYMER AND HYDROGEN MOLECULE STORAGE METHOD, HYDROGEN STORAGE DEVICE, HYDROGEN MOLECULE SEPARATION METHOD AND HYDROGEN PURIFIER USING THE SAME

BACKGROUND

1. Technical Field

The present invention relates to a porous coordination polymer. The present invention also relates to a hydrogen molecule storage method, a hydrogen storage device, a hydrogen molecule separation method, and a hydrogen purifier using the porous coordination polymer.

2. Description of the Related Art

Porous coordination polymers are disclosed in Patent Literature 1, Patent Literature 2, Non-Patent Literature 1, and Non-Patent Literature 2. The porous coordination polymer disclosed in these literatures is formed of plural unit lattices. Each unit lattice has a shape of a cube having eight vertexes and twelve sides.

CITATION LIST

Patent Literature

Patent Literature 1: Japanese Patent Application laid-open Publication No. 2013-040119
Patent Literature 2: U.S. Pat. No. 6,929,679

Non-Patent Literature

Non-Patent Literature 1: David J. Tranchemontagne et. al., "Room temperature synthesis of metal-organic frameworks: MOF-5, MOF-74, MOF-177, MOF-199, and IRMOF-0", Tetrahedron 64 (2009), 8553-8557
Non-Patent Literature 2: Jie Yang, "Hydrogen storage in Metal Organic Frameworks", Master of Science in Chemistry, Xiaan Normal University, Xi'an, China, 2012

SUMMARY

The present invention provides a porous coordination polymer, wherein
the porous coordination polymer is formed of unit lattices;
each of the unit lattices has a shape of a cube having eight vertexes and twelve sides;
each of the vertexes of the unit lattices consists of a $Zn_4O$ cluster;
each of the sides of the unit lattices consists of a $^-OOC-C\equiv C-COO^-$ group; and
at least a part of the unit lattices contains at least one hydrogen molecule.

The present invention also provides a porous coordination polymer, wherein
the porous coordination polymer is formed of unit lattices;
each of the unit lattices has a shape of a cube having eight vertexes and twelve sides;
each of the vertexes of the unit lattices consists of a $Zn_4O$ cluster;
each of the sides of the unit lattices consists of a $^-OOC-C\equiv C-COO^-$ group; and
the inside of at least a part of the unit lattices is empty.

The present invention provides a novel porous coordination polymer, especially, a porous coordination polymer suitable for separating hydrogen molecules from a gaseous mixture of the hydrogen molecules and impurity molecules (e.g., nitrogen molecules, oxygen molecules, or carbon dioxide molecules).

DETAIL DESCRIPTION OF THE EMBODIMENT

Figure 1:
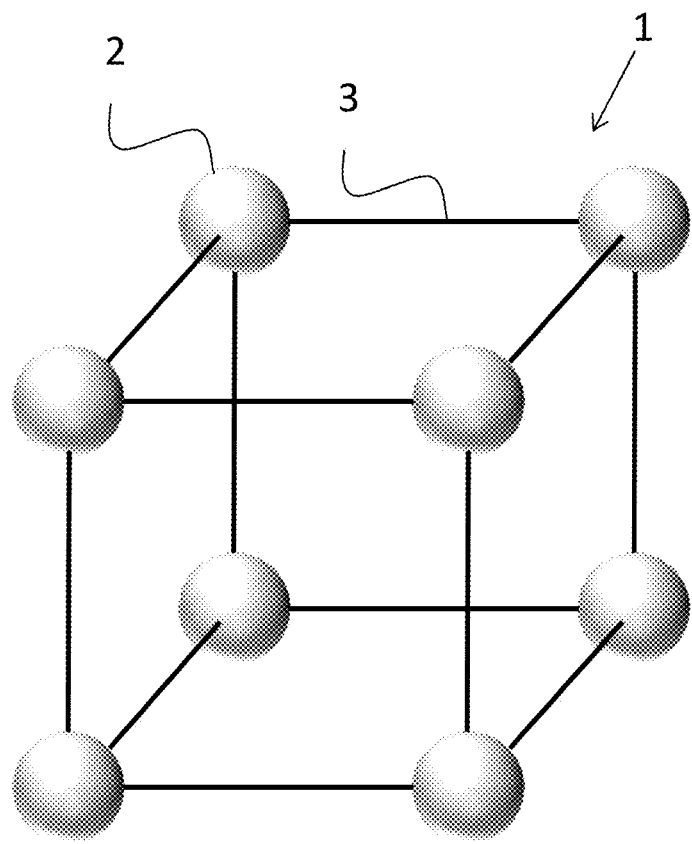
FIG. 1 shows a schematic view of one unit lattice included in a porous coordination polymer according to the present embodiment.

Hereinafter, the embodiment of the present invention will be described with reference to the drawings.
(Porous Coordination Polymer)
The porous coordination polymer 1 according to the present embodiment is formed of plural unit lattices. FIG. 1 shows a schematic view of one unit lattice. As shown in FIG. 1, one unit lattice has a shape of a cube having eight vertexes 2 and twelve sides 3.
The vertex 2 consists of a $Zn_4O$ cluster. The side 3 consists of acetylene dicarboxylic acid dianion represented by the following chemical formula (I).

$^-OOC-C\equiv C-COO^-$     (I)

The porous coordination polymer 1 according to the present embodiment is characterized by that at least a part of the unit lattices contains at least one hydrogen molecule only. Ideally, all of the plural unit lattices contain hydrogen molecules only. However, a part of the unit lattices may contain a hydrogen molecule only, whereas the remaining unit lattice needs not to contain a hydrogen molecule. This matter will be described in more detail later.

The number of the hydrogen molecules contained in one unit lattice may be one. However, the number of the hydrogen molecules contained in one unit lattice may be two or more.

Alternatively, the porous coordination polymer 1 according to the present embodiment is characterized by that the inside of at least a part of the unit lattices is empty. Ideally, all of the plural unit lattices are empty. However, a part of the unit lattices may be empty. This matter also will be described in more detail later.

Figure 2:
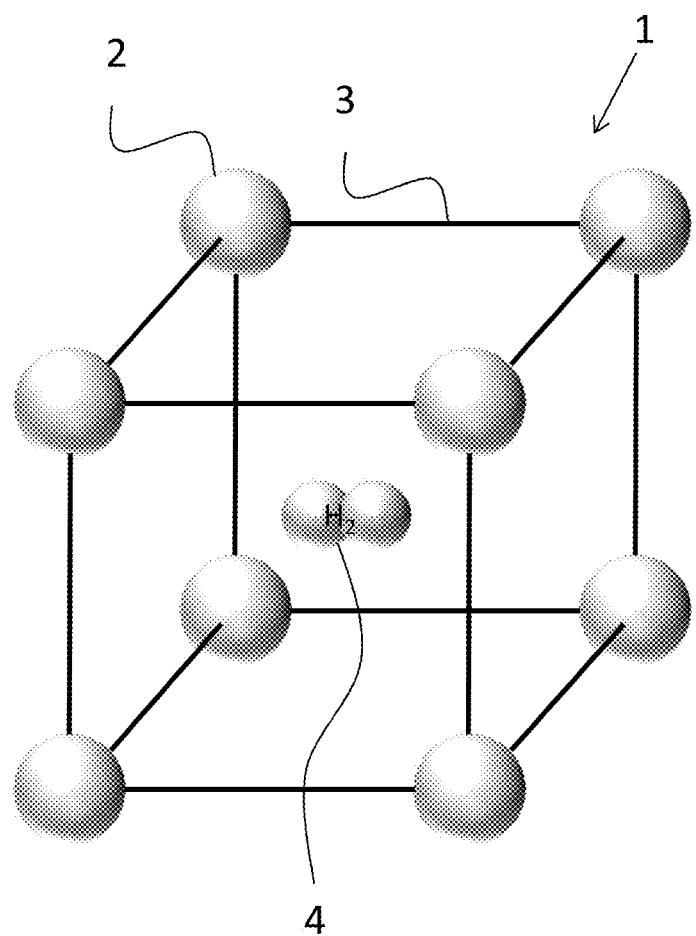
FIG. 2 shows a schematic view of the unit lattice in which a hydrogen molecule has located.

The porous coordination polymer 1 according to the present embodiment is capable of absorbing hydrogen molecules into the inside thereof. In more detail, as shown in FIG. 2, a hydrogen molecule 4 may be located in the inside of the unit lattice. When the porous coordination polymer 1 according to the present embodiment is brought into contact with a gas containing hydrogen molecules, the hydrogen molecule 4 enters the inside of the unit lattice. The absorption method of the hydrogen molecule will be described in more detail later.

On the other hand, nitrogen molecules, oxygen molecules, and carbon dioxide molecules do not enter the inside of the unit lattice. This matter also will be described later in more detail.

When a gas containing not only hydrogen molecules but also impurity molecules (e.g., nitrogen molecules, oxygen molecules, or carbon dioxide molecules) is brought into contact with the porous coordination polymer 1 according to the present embodiment, the hydrogen molecule enters the inside of the unit lattice so as to be located in the unit lattice, whereas the impurity molecules do not enter the inside of the unit lattice. In other words, only the hydrogen molecule enters the inside of the unit lattice. In this way, the hydrogen molecule is separated from the impurity molecules, and the impurity molecules contained in the gas are removed. Hereinafter, in the instant specification, this matter is referred to as "hydrogen molecule selectivity". In other words, the hydrogen molecule selectivity means that only at least one hydrogen molecule is located in the inside of the porous coordination polymer upon the contact of the gas. The porous coordination polymer 1 according to the present embodiment has high hydrogen molecules selectivity. The hydrogen molecule selectivity also will be described later in more detail.

(Difference from the Prior Arts)

Non-Patent Literature 1 also discloses a porous coordination polymer formed of plural unit lattices each having a shape of a cube. The unit lattice of the porous coordination polymer disclosed in Non-Patent Literature 1 consists of eight $Zn_4O$ clusters and twelve acetylene dicarboxylic acid dianion molecules.

Figure 3:
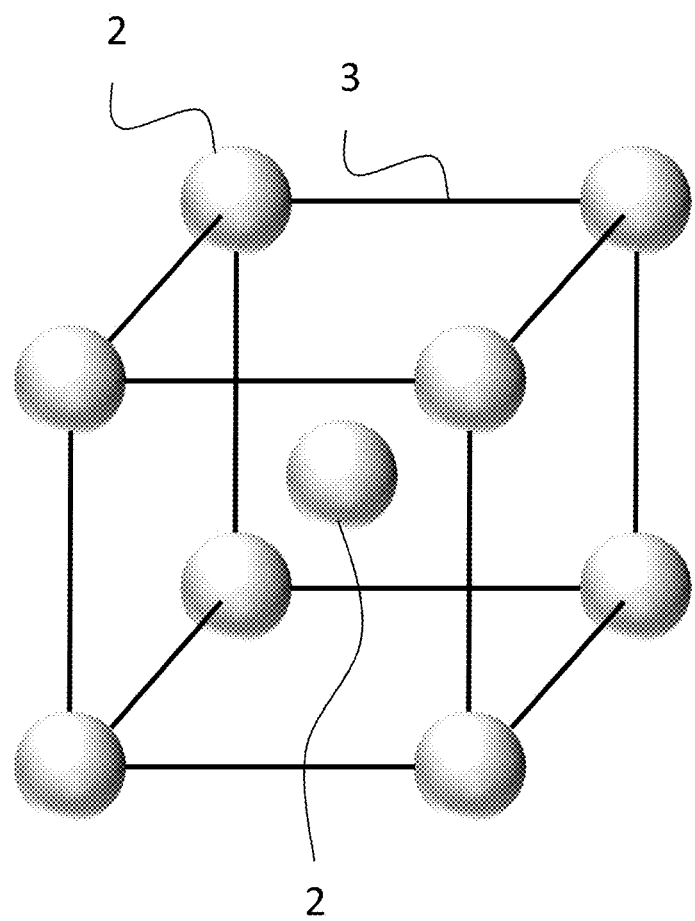
FIG. 3 shows a schematic view of one unit lattice included in the porous coordination polymer disclosed in Non-Patent Literature 1.
Figure 4:
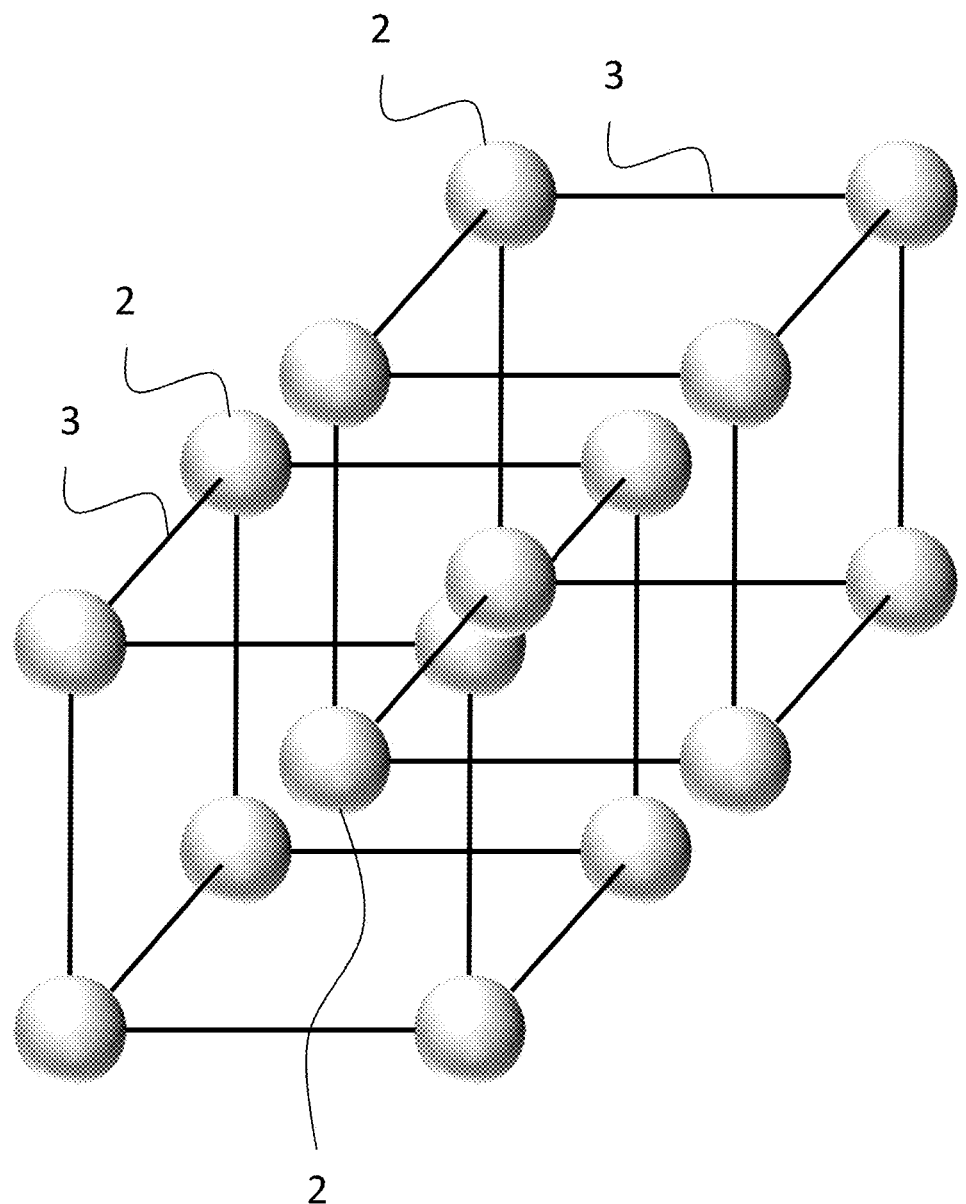
FIG. 4 shows a schematic view of two unit lattices included in the porous coordination polymer disclosed in Non-Patent Literature 1.

However, in Non-Patent Literature 1, as shown in FIG. 3, the $Zn_4O$ clusters 2 are located not only at the vertexes of the unit lattice but also at centers of almost all the unit lattices. As schematically shown in FIG. 4, in the porous coordination polymer disclosed in Non-Patent Literature 1, two unit lattices are overlapped partially with each other in such a manner that one of the eight vertexes of one unit lattice is located at the center of the other unit lattice. For this reason, a hydrogen molecule fails to enter the inside of the unit lattice. See FIG. 6 and the second paragraph on page 8556 of Non-Patent Literature 1.

On the other hand, since the inside of at least a part of the unit lattice of the porous coordination polymer 1 according to the present embodiment is empty, by necessity, the inside does not include a $Zn_4O$ cluster 2. Therefore, a hydrogen molecule enters the inside of the unit lattice. The spirits of the present invention also includes the porous coordination polymer in which a hydrogen molecule is located in the inside of the unit lattice, as shown in FIG. 2.

Non-Patent Literature 1 discloses a difference of the porous coordination polymer including unit lattices each not having the $Zn_4O$ cluster 2 at the center thereof (See FIG. 1) from the porous coordination polymer formed only of the unit lattices each having the $Zn_4O$ cluster 2 at the center thereof (See FIG. 3).

Figure 5:
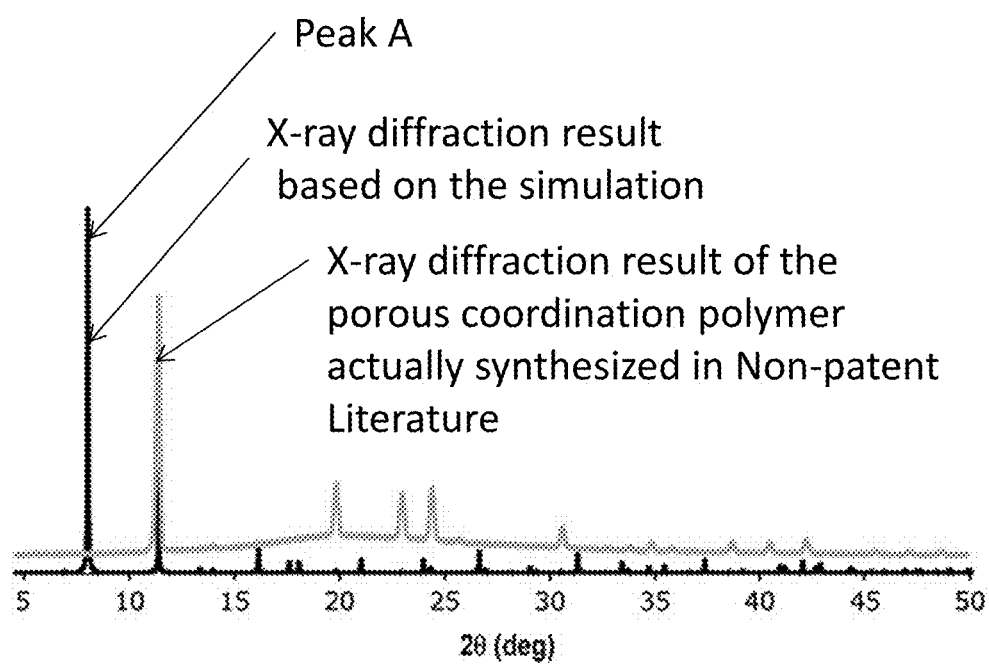
FIG. 5 is a duplicate of FIG. 4 included in Non-Patent Literature 1.

FIG. 5 is a duplicate of FIG. 4 included in Non-Patent Literature 1. As shown in FIG. 5, the authors of Non-Patent Literature 1 found through simulation that a peak appears within a range of 2θ of not less than 5 and not more than 10 in the X-ray diffraction analysis of the porous coordination polymer including unit lattices each not having the $Zn_4O$ cluster 2 at the center thereof (See FIG. 1), whereas the peak does not appear within a range of 2θ of not less than 5 and not more than 10 in the X-ray diffraction analysis of the porous coordination polymer formed only of the unit lattices each having the $Zn_4O$ cluster 2 at the center thereof (See FIG. 3). With regard to the above-mentioned peak, see the referential sign "A" included in FIG. 5. Hereinafter, the peak will be referred to as "peak A".

The authors of Non-Patent Literature 1 say that they found through simulation that the porous coordination polymer including the unit lattices shown in FIG. 1 exhibits the peak A in the X-ray diffraction analysis, however, they also found that the porous coordination polymer synthesized actually by the authors of Non-Patent Literature 1 did not exhibit the peak A in the X-ray diffraction analysis. See the third paragraph on page 8555 of Non-Patent Literature 1. For this reason, the authors of Non-Patent Literature 1 reported that they synthesized the porous coordination polymer including unit lattices as shown in FIG. 3. As reported in the second paragraph on page 8556 of Non-Patent Literature 1, this matter accords with the report by the authors of Non-Patent Literature 1 that hydrogen molecules was not absorbed into the porous coordination polymer.

Non-Patent Literature 2 also discloses a porous coordination polymer formed of unit lattices each having a shape of a cube. The unit lattice of the porous coordination polymer disclosed in Non-Patent Literature 2 is formed of eight $Zn_4O$ clusters and twelve acetylene dicarboxylic acid dianion molecules.

Figure 6:
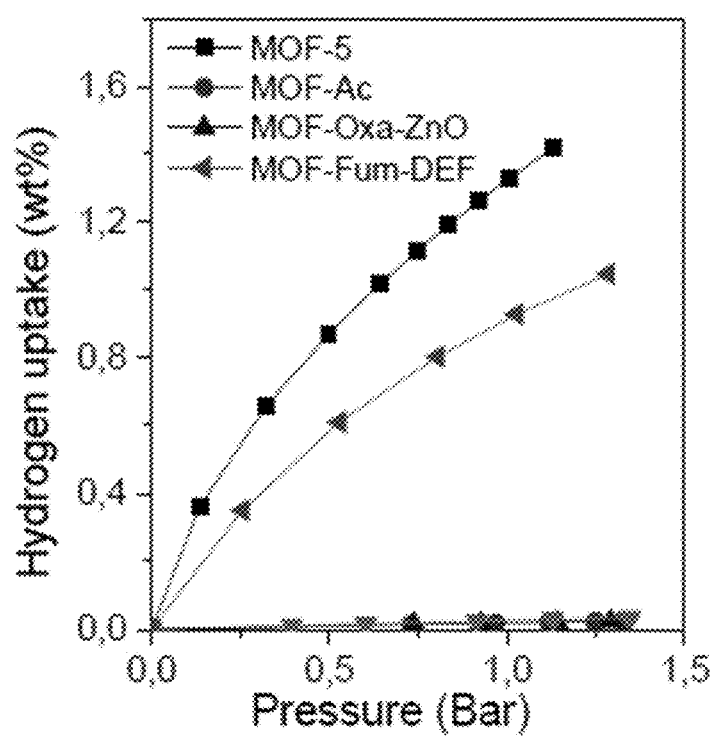
FIG. 6 is a duplicate of FIG. 6.12 included in Non-Patent Literature 2.

FIG. 6 is a duplicate of FIG. 6.12 of Non-Patent Literature 2. In Non-Patent Literature 2, the porous coordination polymer formed of the unit lattices each formed of eight $Zn_4O$ clusters and twelve acetylene dicarboxylic acid dianion molecules is referred to as "MOF-Ac". FIG. 6 is a graph showing a hydrogen absorption amount of the porous coordination polymer synthesized in Non-Patent Literature 2. As is clear from FIG. 6, the porous coordination polymer MOF-Ac synthesized in Non-Patent Literature 2 does not absorb a hydrogen molecule at all. Therefore, similarly to the case of Non-Patent Literature 1, also in Non-Patent Literature 2, the $Zn_4O$ clusters 2 are located not only at the vertexes of the unit lattices but also at the centers of almost all the unit lattices. Therefore, a hydrogen molecule does not enter the inside of the unit lattice.

The present inventors believe that two kinds of different porous coordination polymers shown in FIG. 1 and FIG. 3 are synthesized depending on a starting material for the $Zn_4O$ cluster 2. In the present embodiment, the starting material for the $Zn_4O$ cluster 2 is zinc nitrate tetrahydrate. On the other hand, in Non-Patent Literature 1, the starting material for $Zn_4O$ cluster 2 is zinc acetate dihydrate. In Non-Patent Literature 2, the starting material for $Zn_4O$ cluster 2 is zinc nitrate hexahydrate.

As disclosed in Non-Patent Literature 1, one $Zn_4O$ cluster 2 includes plural subclusters. One subcluster consists of one zinc atom and four oxygen atoms. The one subcluster has a shape of a regular tetrahedron. The four oxygen atoms are located at the vertexes of the regular tetrahedron. One molecule of zinc nitrate tetrahydrate includes one zinc atom and four water molecules. One water molecule includes one oxygen atom.

If zinc salt tetrahydrate is used, one molecule of zinc salt tetrahydrate is changed to the one subcluster included in the $Zn_4O$ cluster 2 without excess and deficiency of an oxygen atom derived from water.

On the other hand, if zinc salt dihydrate or zinc salt hexahydrate is used, one molecule of zinc salt is changed to the one subcluster included in the $Zn_4O$ cluster with excess and deficiency of an oxygen atom derived from water. The excess amount of zinc atoms or oxygen atoms causes the $Zn_4O$ cluster 2 to be located at the center of the unit lattice, as shown in FIG. 3.

Patent Literature 1 discloses a porous coordination polymer formed of unit lattices each having a shape of a cube. The unit lattice of the porous coordination polymer disclosed in Patent Literature 1 consists of eight $Zn_4O$ clusters and twelve terephthalic acid dianion molecules or twelve $^-OOC-C\equiv C-COO^-$ molecules (where Ph represents a phenyl group). Patent Literature 1 discloses that the porous coordination polymer has hydrogen adsorption ability; however, in Patent Literature 1, note that acetylene dicarboxylic acid is not used.

As demonstrated in the comparative example 1 which will be described later, not only a hydrogen molecule but also a nitrogen molecule easily enters the inside of the unit lattice of the porous coordination polymer disclosed in Patent Literature 1. For this reason, the porous coordination polymer disclosed in Patent Literature 1 has low hydrogen molecule selectivity. In Patent Literature 1, the starting material for the $Zn_4O$ cluster is zinc nitrate hexahydrate.

Patent Literature 2 discloses various porous coordination polymers. Furthermore, the paragraph 0039 of Patent Literature 2 discloses that a gaseous molecule such as hydrocarbon, alcohol, hydrogen, nitrogen, noble gas, CO, $CO_2$, natural gas or synthesis gas enters the inside of the unit lattice of the porous coordination polymer. However, the porous coordination polymer synthesized actually in the example of Patent Literature 2 is formed of unit lattices each constituted by the $Zn_4O$ clusters and terephthalic acid dianion, similarly to the porous coordination polymer synthesized actually in the example of Patent Literature 1. In other words, the porous coordination polymer disclosed in the example of Patent Literature 2 is the same as the porous coordination polymer disclosed in Patent Literature 1. Therefore, similarly to the case of Patent Literature 1, the porous coordination polymer synthesized actually in the example of Patent Literature 2 also has low hydrogen molecule selectivity.

(Hydrogen Molecules Selectivity)

Hereinafter, the hydrogen molecules selectivity will be described. As mentioned above, the hydrogen molecules selectivity means that only at least one hydrogen molecule is located in the inside of the porous coordination polymer. Therefore, the impurity molecule such as a nitrogen molecule, an oxygen molecule, or a carbon dioxide molecule is not located in the inside of the porous coordination polymer having high hydrogen molecules selectivity. On the other hand, not only a hydrogen molecule but also such an impurity molecule may be located in the inside of the porous coordination polymer having low hydrogen molecules selectivity.

The present inventors do not like to be bound to a theory; however, the theory that the porous coordination polymer according to the present embodiment has high hydrogen molecules selectivity will be described below.

According to Non-Patent Literature 2, a distance between two adjacent $Zn_4O$ clusters 2 is 2.184 nanometers. In the present embodiment, the side 3 is formed of acetylene dicarboxylic acid dianion. A sp-sp bond length of a triple bond (sp hybrid orbital) of carbon atom-carbon atom both of which are included in an acetylene group is 0.137 nanometers. A sp-$sp^2$ bond length of a carbon atom of a carboxyl group—a carbon atom of an acetylene group is 0.150 nanometers. Therefore, the length of the carbon atom of the carboxyl group—(single bond)—the carbon atom of the acetylene group—(triple bond)—the carbon atom of the acetylene group—(single bond)—the carbon atom of the carboxyl group is 0.437 nanometers ($=0.150+0.137+0.150$ nanometers). Hereinafter, this length is referred to as "$C_4$ length".

Next, a kinetic diameter of a molecule is considered. The kinetic diameter of a molecule is equivalent to the diameter of the molecule. The kinetic diameter of diatomic molecule such as a hydrogen molecule or a nitrogen molecule is calculated on the basis of the following mathematical formula (II).

(Kinetic diameter of diatomic molecule)=2·(covalent radius)+2·(van der Waals' radius)  (II)

According to the mathematical formula (II), a hydrogen molecule has a kinetic diameter of 0.301 nanometers. Since this value of the kinetic diameter is much smaller than the $C_4$ length (i.e., 0.437 nanometers), a hydrogen molecule enters the inside of the unit lattice.

On the other hand, according to the mathematical formula (II), a nitrogen molecule and an oxygen molecule have kinetic diameters of 0.452 nanometers and 0.436 nanometers, respectively. Since these values of the kinetic diameters are substantially equal to or more than the $C_4$ length (i.e., 0.437 nanometers), a nitrogen molecule and an oxygen molecule do not enter the inside of the unit lattice. Pay attention to molecular motion. In other words, in light of actual molecular motion, the entry of the molecule into the unit lattice requires that the kinetic diameter of the molecule is much smaller than the $C_4$ length.

The kinetic diameter of a linear triatomic molecule such as carbon dioxide is calculated on the basis of the following mathematical formula (III).

(Kinetic diameter of linear triatomic molecule)=2·(covalent bond length between the center atom and the end atom)+2·(van der Waals' radius of the end atom)  (III)

According to the mathematical formula (III), a carbon dioxide molecule has a kinetic diameter of 0.536 nanometers ($=2\times1.16+2\times1.52$ nanometers). Since the kinetic diameter of a carbon dioxide molecule is more than the $C_4$ length (i.e., 0.437 nanometers), a carbon dioxide molecule does not enter the inside of the unit lattice.

(Other Embodiment)

Hereinafter, a method and a device for storing hydrogen with the porous coordination polymer 1 according to the present embodiment will be described.

Figure 12:
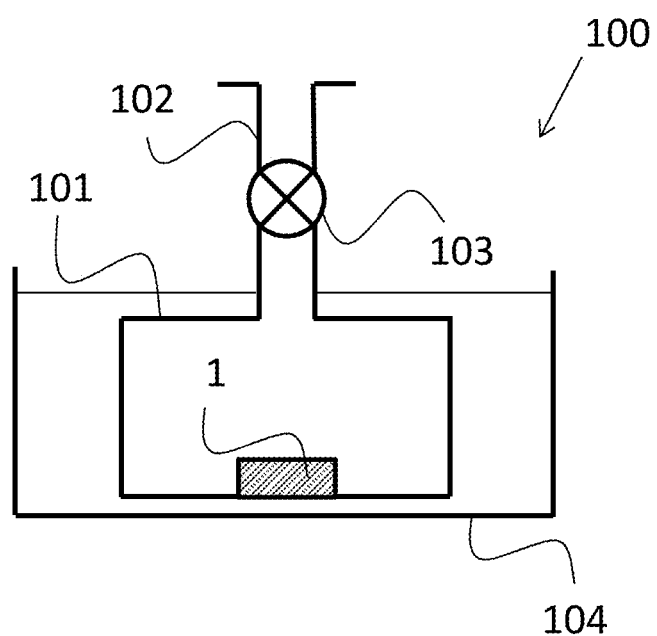
FIG. 12 shows a schematic view of a hydrogen storage device comprising the porous coordination polymer according to the present embodiment.

FIG. 12 shows a schematic view of a hydrogen storage device 100 comprising the porous coordination polymer 1 according to the present embodiment. The hydrogen storage device 100 comprises a sealed container 101 such as a gas bottle and an inlet 102, as shown in FIG. 12. The inlet 102 is provided with a valve 103.

The porous coordination polymer 1 according to the present embodiment is disposed in the inside of the sealed container 101. At this point, the unit lattices are empty. In other words, the unit lattices do not contain hydrogen molecules. Then, a gas containing hydrogen molecules is supplied to the inside of the sealed container 101 through the inlet 102. Needless to say, the valve 103 is open during the supply of the gas. In this way, the porous coordination polymer 1 according to the present embodiment is brought into contact with the gas. As mentioned above, the hydrogen molecule contained in the gas enters the inside of the unit lattice of the porous coordination polymer 1 according to the present embodiment. In this way, the hydrogen molecule is stored in the inside of the unit lattice of the porous coordination polymer 1 according to the present embodiment. The gas may contain not only the hydrogen molecule but also impurity molecules (e.g., nitrogen molecules, oxygen molecules, or carbon dioxide molecules). After the supply of the gas, the valve 103 is closed.

The pressure and temperature of the gas upon the contact with the porous coordination polymer 1 is not limited, as far as a hydrogen molecule enters the inside of the unit lattice. As one example, the gas may have a pressure of more than 0 Pa and not more than $1.0 \times 10^5$ Pa (i.e., the atmospheric pressure). The gas may have a temperature of not less than 0 degrees Celsius and not more than 50 degrees Celsius (desirably, room temperature of approximately 25 degrees Celsius).

The hydrogen storage device 100 may comprise a thermostat 104. The thermostat 104 is located around the sealed container 101 and maintains the temperature of the sealed container 101 at a constant temperature. As demonstrated in the inventive example 1 which will be described later, when the temperature of the porous coordination polymer 1 according to the present embodiment is maintained at a constant temperature, a hydrogen molecule is promoted to enter the inside of the unit lattice. An example of the thermostat 104 is a thermostat bath in which water is stored. At least a part of the sealed container 101 is immersed in the water stored in the thermostat bath. The temperature of the water is maintained at a constant temperature.

When the inside of the sealed container 101 is heated, the hydrogen molecule which has been stored in the inside of the unit lattice of the porous coordination polymer 1 according to the present embodiment is released. Also when the inside of the sealed container 101 is depressurized, the hydrogen molecule which has been stored in the inside of the unit lattice of the porous coordination polymer 1 according to the present embodiment is released. The heating and the depressurizing may be conducted at the same time. Specifically, the porous coordination polymer 1 formed of the unit lattices in which hydrogen molecules have been stored may be left under reduced pressure (e.g., not less than 0 Pa and less than $1.0 \times 10^5$ Pa (i.e., the atmospheric pressure)) to release the hydrogen molecules. The temperature of the inside of the sealed container 101 upon the release of the hydrogen molecules may be not less than 0 degrees Celsius and not more than 50 degrees Celsius (desirably, room temperature of approximately 25 degrees Celsius). In this way, the hydrogen molecules are released out of the sealed container 101 through the inlet 102. Needless to say, the valve 103 is open during the release of the hydrogen molecules.

Figure 13:
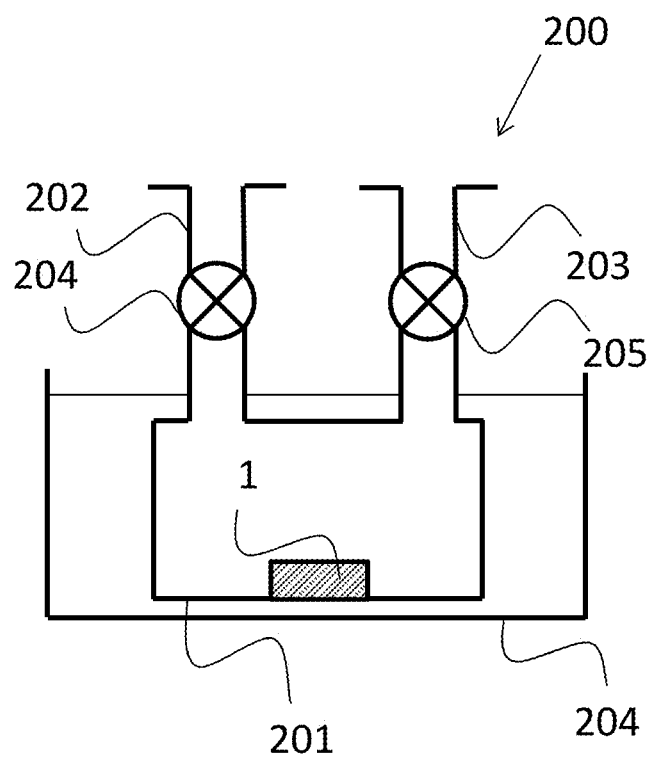
FIG. 13 shows a schematic view of a hydrogen purifier comprising the porous coordination polymer according to the present embodiment.

FIG. 13 shows a schematic view of a hydrogen purifier 200 with the porous coordination polymer 1 according to the present embodiment. The hydrogen purifier 200 comprises a sealed container 201 such as a gas bottle, an inlet 202, and an outlet 203, as shown in FIG. 13. The inlet 202 and the outlet 203 are provided with an inlet valve 204 and an outlet valve 205, respectively.

The porous coordination polymer 1 according to the present embodiment is disposed in the inside of the sealed container 201. At this point, the unit lattices are empty. In other words, the unit lattices do not contain hydrogen molecules. Then, a gas containing not only hydrogen molecules but also the impurity molecules (e.g., nitrogen molecules, oxygen molecules, or carbon dioxide molecules) is supplied to the inside of the sealed container 201 through the inlet 202. Needless to say, the inlet valve 204 is open during the supply of the gas. In this way, the porous coordination polymer 1 according to the present embodiment is brought into contact with the gas.

As described above, the hydrogen molecules contained in the gas enter the unit lattices of the porous coordination polymer 1 according to the present embodiment. In this way, the hydrogen molecules are stored in the inside of the unit lattice of the porous coordination polymer 1 according to the present embodiment. On the other hand, the impurity molecules (e.g., nitrogen molecules, oxygen molecules, or carbon dioxide molecules) contained in the gas do not enter the inside of the unit lattices. In this way, the hydrogen molecules contained in the gas are separated selectively from the impurity molecules.

The gas containing the impurity molecules is discharged from the sealed container 201 through the outlet 203. Needless to say, the outlet valve 205 is open during the discharge of the gas. In this way, the purity of hydrogen molecules is increased. The temperature and pressure of the gas upon the contact with the porous coordination polymer are the same as those in FIG. 12.

Actually, the gas flows continuously from the inlet 202 to the outlet 203 through the inside of the sealed container 201, while both the inlet valve 204 and the outlet valve 205 are open. As just described, the gas flows continuously through the periphery of the porous coordination polymer 1.

Then, similarly to the case of FIG. 12, the hydrogen molecules which have been stored in the inside of the unit lattices of the porous coordination polymer 1 according to the present embodiment are released. The temperature and pressure upon the release of the hydrogen molecules is the same as those in FIG. 12.

(Preparation Method)

With regard to a method for preparing the porous coordination polymer according to the present embodiment, see the example which will be described below. A skilled person who has read the instant specification would easily prepare the porous coordination polymer according to the present embodiment.

EXAMPLES

The present invention will be described in more detail with reference to the following examples.

Inventive Example 1

(Synthesis of Porous Coordination Polymer)

Zinc acetate tetrahydrates (2 grams, available from Merck), acetylene dicarboxylic acid (0.5 grams, available from Aldrich), and N,N-dimethylformamide (20 milliliters, infinity pure grade, available from Wako Pure Chemical Industries, Ltd.) were added to a glass tube having a volume of 30 milliliters to provide a mixture. The mixture was stirred to provide a solution.

Triethylamine (0.1 milliliter) was added to the solution. The solution was further stirred. A lid was attached to the glass tube. Then, the solution was left at rest for twelve hours. In this way, a porous coordination polymer was obtained.

The present inventors believe that the porous coordination polymer is synthesized as below. While the solution is left at rest, $Zn_4O^{6+}$ clusters are generated in the solution. Then, acetylene dicarboxylic acid dianions bind to the $Zn_4O^{6+}$ clusters as ligands. This is repeated, and three-dimension polymer is finally obtained.

The obtained porous coordination polymer was added to a centrifuge tube having a volume of 50 milliliters. Then, the porous coordination polymer was washed as below in the inside of the centrifuge tube.

First, N,N-dimethylformamide (20 milliliters) was added to the centrifuge tube to provide a solution. Then, the solution was stirred for one hour. The solution was centrifuged at gravity acceleration of approximately 7,200 G. Then, N,N-dimethylformamide (i.e., supernatant) was removed. This was repeated once again.

Then, methanol (20 milliliters) was added to the centrifuge tube to provide a solution. Then, the solution was stirred for one hour. The solution was centrifuged at gravity acceleration of approximately 7,200 G. Then, methanol (i.e., supernatant) was removed. This was repeated once again.

Once again, N,N-dimethylformamide (20 milliliters) was added to the centrifuge tube to provide a solution. Then, the solution was stirred for one hour. The solution was centrifuged at gravity acceleration of approximately 7,200 G. Then, N,N-dimethylformamide (i.e., supernatant) was removed.

Yet again, N,N-dimethylformamide (20 milliliters) was added to the centrifuge tube to provide a solution. Then, the solution was stirred for twelve hours. The solution was centrifuged at gravity acceleration of approximately 7,200 G. Then, N,N-dimethylformamide (i.e., supernatant) was removed. In this way, the porous coordination polymer (i.e., precipitate) was purified. The purified porous coordination polymer was dried under vacuum pressure of not more than 10 Pa for 24 hours. In this way, the porous coordination polymer according to the inventive example 1 was obtained.

(Identification of Porous Coordination Polymer)

Figure 7A:
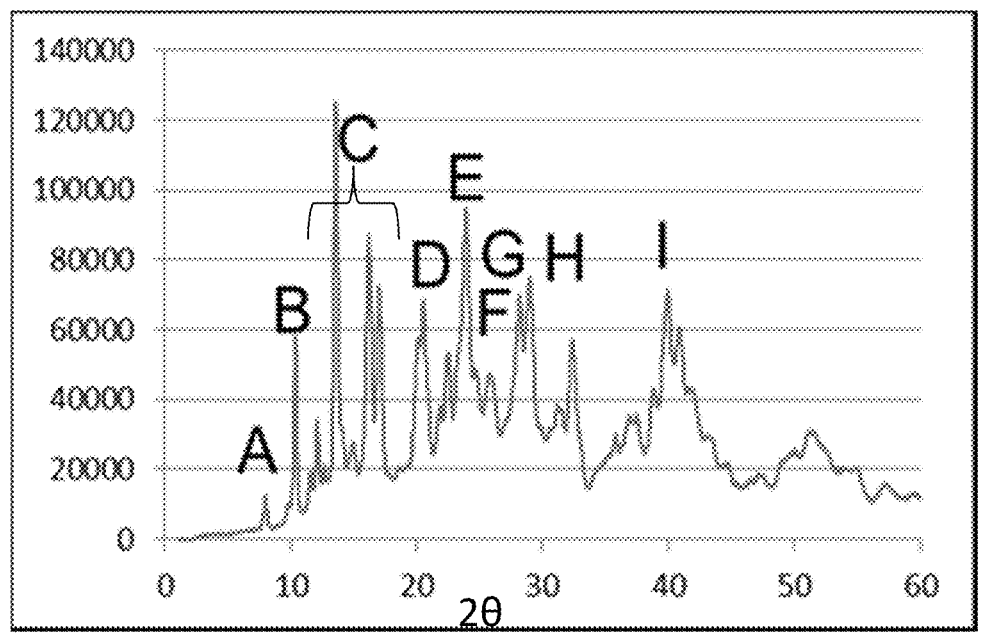
FIG. 7A is a graph showing a result of an X-ray diffraction analysis of the porous coordination polymer according to the inventive example 1.
Figure 7B:
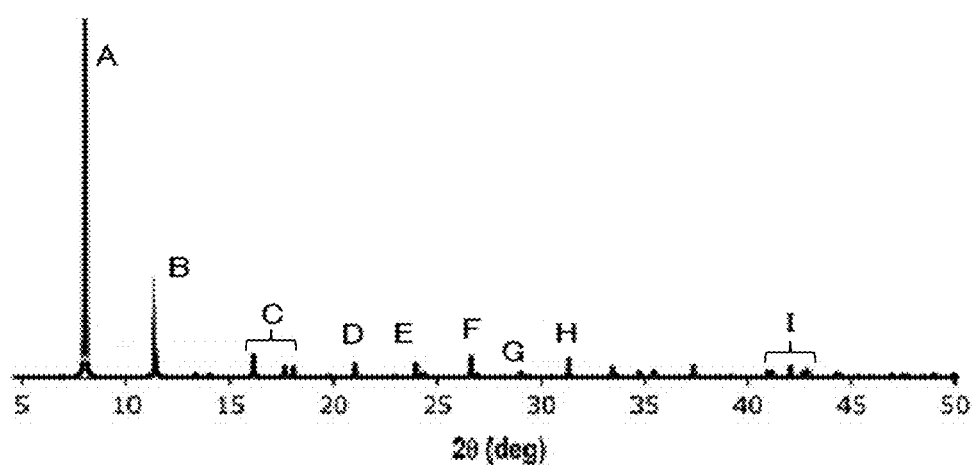
FIG. 7B is a graph showing a result of the X-ray diffraction analysis based on the simulation disclosed in Non-Patent Literature 1.

The porous coordination polymer according to the inventive example 1 was subject to an X-ray diffraction analysis. FIG. 7A is a graph showing a result of the X-ray diffraction analysis. FIG. 7B is a graph showing a result of the X-ray diffraction analysis on the basis of the simulation in Non-Patent Literature 1. Positions of peaks A to I shown in FIG. 7A accord with positions of peaks A to I shown in FIG. 7B. Therefore, it was proofed that the porous coordination polymer according to the inventive example 1 included a unit lattice not having the $Zn_4O$ cluster 2 at the center thereof (i.e., a unit lattice the inside of which is empty, as shown in FIG. 1). Note that the peak A appears within the range of $2\theta$ of not less than 5 and not more than 10 in FIG. 7A. This means that the porous coordination polymer includes a unit lattice not having the $Zn_4O$ cluster 2 at the center thereof (i.e., a unit lattice the inside of which is empty, as shown in FIG. 1).

(Hydrogen Molecule Absorption Ability of Porous Coordination Polymer)

The porous coordination polymer according to the inventive example 1 (100 milligrams) was added to an inside of a glass cell. Then, the inside of the glass cell was vacuated at a temperature of 60 degrees Celsius.

The glass cell was immersed in a thermostat bath. The temperature in the thermostat bath was maintained at room temperature (i.e., approximately 25 degrees Celsius). While the glass cell is immersed in the thermostat bath, the pressure of hydrogen contained in the glass cell was gradually increased using a gas sorption analyzer (available from Quanta chrome instrument, trade name: Automated Gas Sorption Analyzer). After the pressure of the hydrogen introduced to the glass cell was $1.0 \times 10^5$ Pa, the inside of the glass cell was depressurized gradually.

Figure 8:
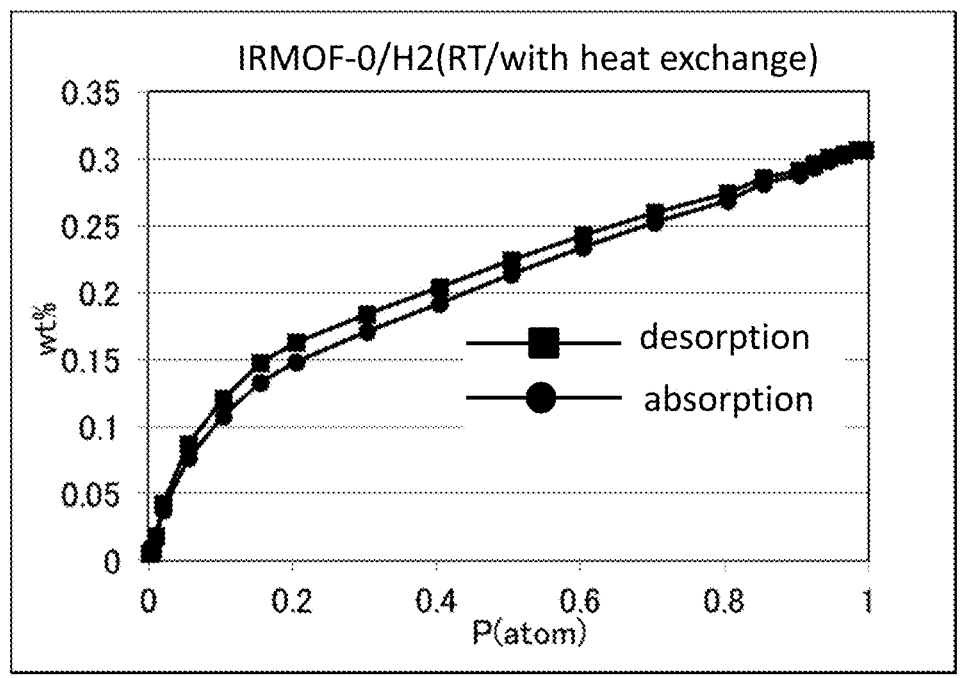
FIG. 8 is a graph showing a result of an experiment of hydrogen molecule absorption ability of the porous coordination polymer according to the inventive example 1.

FIG. 8 is a graph showing a result of this experiment. As is clear from FIG. 8, when the pressure of the hydrogen was gradually increased, hydrogen molecules were absorbed into the inside of the porous coordination polymer. When the pressure of the hydrogen gradually decreased, the hydrogen molecules were released from the inside of the porous coordination polymer.

Figure 9:
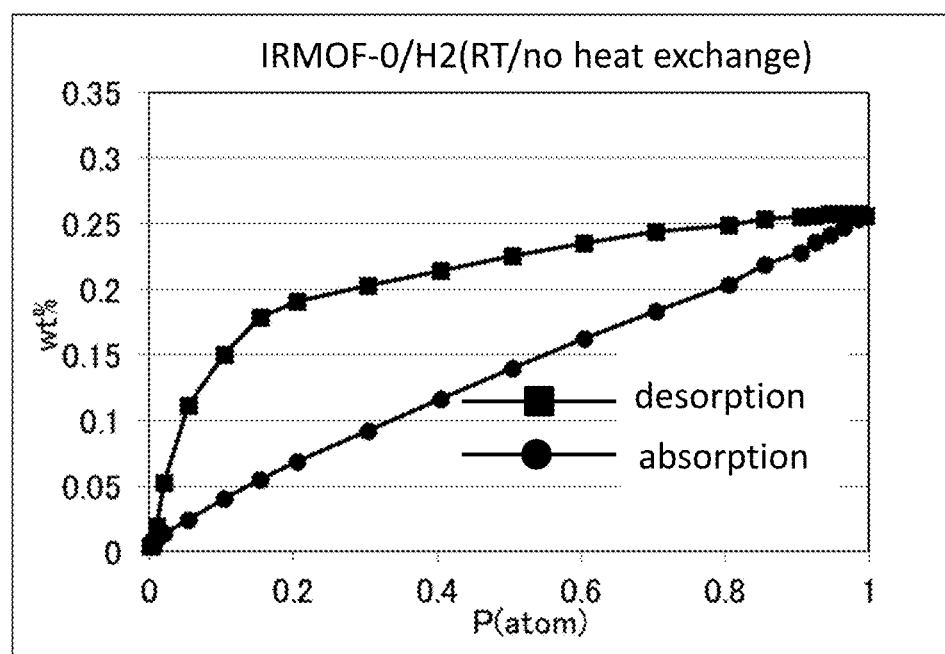
FIG. 9 is a graph showing a result of an experiment of the hydrogen molecule absorption ability of the porous coordination polymer according to the inventive example 1 without using a thermostat bath.

A similar experiment was repeated without using the thermostat bath. FIG. 9 is a graph showing a result of this experiment. A result similar to the case of using the thermostat bath was obtained, except that efficiency of the absorption of the hydrogen molecules into the inside of the porous coordination polymer was low due to adsorption heat. As is clear from the comparison of FIG. 8 to FIG. 9, it is desirable that the temperature of the porous coordination polymer is maintained at a constant temperature.

(Hydrogen Molecular Selectivity of Porous Coordination Polymer)

Figure 10:
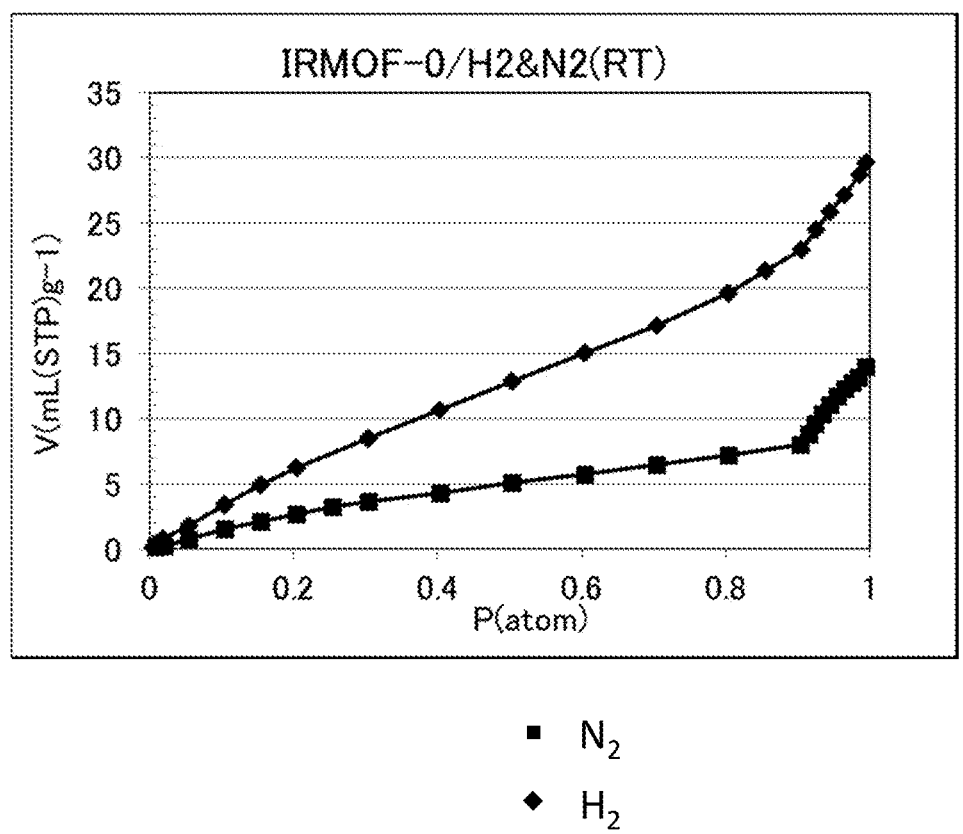
FIG. 10 is a graph showing a result of an experiment of hydrogen molecule selectivity of the porous coordination polymer according to the inventive example 1.

An experiment similar to the experiment of the hydrogen molecule absorption ability using the thermostat bath was conducted except for using nitrogen in place of hydrogen. FIG. 10 is a graph showing the result thereof. The vertical axis of the graph shown in FIG. 10 indicates the total volume of the gas absorbed into the inside of the porous coordination polymer and the gas adsorbed on the surface of the porous coordination polymer at a standard status (i.e., 0 degrees Celsius, $1.0 \times 10^5$ Pa).

In light of the kinetic diameters of a hydrogen molecule and a nitrogen molecule, the present inventors believe that none of the nitrogen molecules were absorbed into the inside of the porous coordination polymer; rather, all the nitrogen molecules were adsorbed on the surface of the porous coordination polymer. In FIG. 10, the amount of the hydrogen molecules is much more than the amount of the nitrogen molecules. The present inventors believe that this is because almost all the hydrogen molecules were absorbed into the inside of the porous coordination polymer.

Furthermore, as shown in FIG. 13, while the glass cell (namely, the sealed container 201) containing the porous coordination polymer 1 was immersed in the thermostat bath (25 degrees Celsius), a gaseous mixture of hydrogen and nitrogen ($1.0 \times 10^5$ Pa) was introduced into the glass cell through the inlet 202. The gaseous mixture had hydrogen:nitrogen volume ratio of 50%:50%. In this way, the porous coordination polymer according to the inventive example 1 was brought into contact with the gaseous mixture.

The volume ratio of hydrogen to nitrogen contained in the gaseous mixture discharged from the outlet 203 was measured by a gas chromatography method. As a result, the gaseous mixture discharged from the outlet 203 had hydrogen:nitrogen volume ratio of 36%:64%.

Next, the inlet valve 204 and the outlet valve 205 were closed. The inside of the sealed container 201 was depressurized to $1.0×10^3$ Pa to release a gas from the inside of the porous coordination polymer 1. The gas contained in the sealed container 201 was subject to the gas chromatography. As a result, the gas contained in the sealed container 201 had hydrogen:nitrogen volume ratio of 66%:34%. As above mentioned, the present inventors believe that all the nitrogen molecules were adsorbed on the surface of the porous coordination polymer 1. In this way, the purity of hydrogen was increased.

A similar experiment without the thermostat bath was repeated. As a result of the measurement by the gas chromatography, the gaseous mixture discharged from the outlet 203 had hydrogen:nitrogen volume ratio of 41%:59% under pressure of $10×10^5$ Pa. After the inside of the sealed container 201 was depressurized to $1.0×10^3$ Pa, the gas contained in the sealed container 201 had hydrogen:nitrogen volume ratio of 59%:41%.

Comparative Example 1

Figure 11:
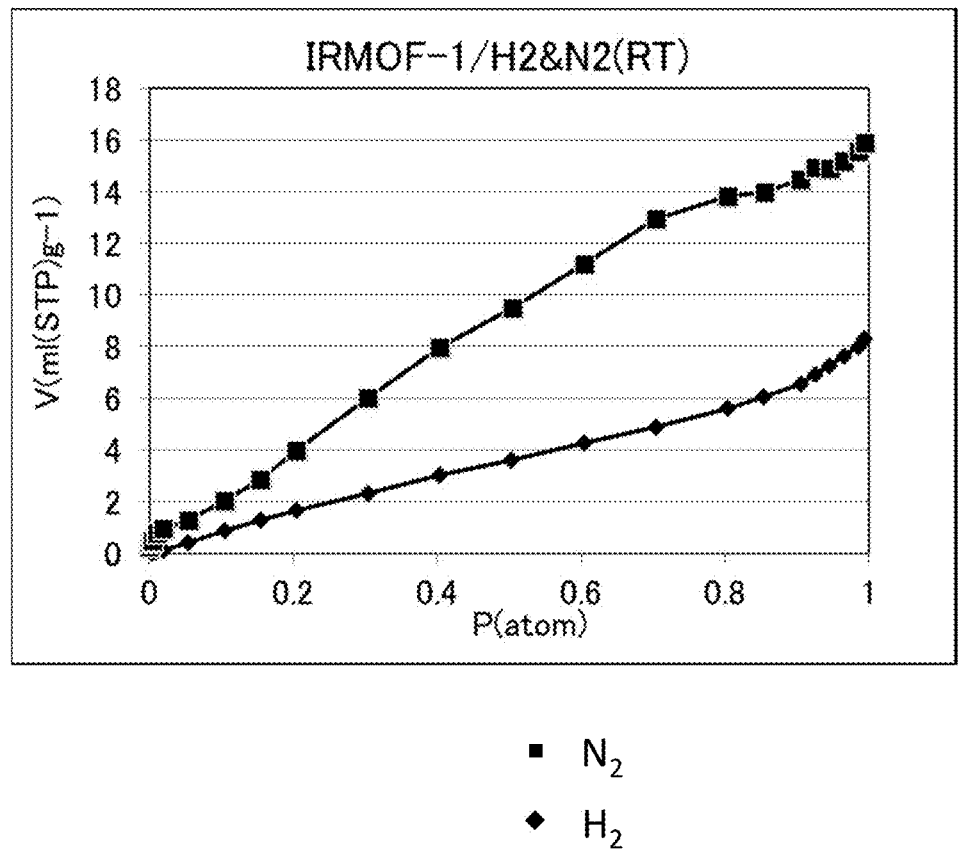
FIG. 11 is a graph showing a result of an experiment of the hydrogen molecule selectivity of the porous coordination polymer according to the comparative example 1.

In the comparative example 1, an experiment similar to the inventive example 1 was conducted except for using terephthalic acid in place of acetylene dicarboxylic acid. The experiment of the comparative example 1 is the substantially same as the example disclosed in Patent Literature 1 and Patent Literature 2. FIG. 11 is a graph showing a result of the experiment of the hydrogen molecule absorption ability of the porous coordination polymer according to the comparative example 1. As is comparison of FIG. 10 to FIG. 11, unlike the porous coordination polymer according to the inventive example 1, the porous coordination polymer according to the comparative example 1 absorbed more nitrogen molecules than hydrogen molecules.

INDUSTRIAL APPLICABILITY

The present invention provides a novel porous coordination polymer, especially, a porous coordination polymer suitable for separating hydrogen molecules from a gaseous mixture of the hydrogen molecules and impurity molecules (e.g., nitrogen molecules, oxygen molecules, or carbon dioxide molecules).

The invention claimed is:

1. A porous coordination polymer, wherein
the porous coordination polymer is formed of unit lattices;
each of the unit lattices has a shape of a cube having eight vertexes and twelve sides;
each of the vertexes of the unit lattices consists of a $Zn_4O$ cluster;
each of the sides of the unit lattices consists of a $^-OOC-C\equiv C-COO^-$ group; and
the inside of at least a part of the unit lattices is empty.

2. The porous coordination polymer according to claim 1, wherein
in an X-ray diffraction analysis, a peak appears within a range of $2\theta$ of not less than 5 and not more than 10.

3. The porous coordination polymer according to claim 1, wherein
the $Zn_4O$ cluster is not located at a center of the unit lattice the inside of which is empty.

4. A method for storing hydrogen molecules, the method comprising:
(a) bringing a gas containing hydrogen molecules into contact with a porous coordination polymer to absorb the hydrogen molecules into the inside of the porous coordination polymer; wherein
the porous coordination polymer is formed of unit lattices;
each of the unit lattices has a shape of a cube having eight vertexes and twelve sides;
each of the vertexes of the unit lattices consists of a $Zn_4O$ cluster;
each of the sides of the unit lattices consists of a $^-OOC-C\equiv C-COO^-$ group; and
the inside of at least a part of the unit lattices is empty.

5. The method according to claim 4, wherein
in an X-ray diffraction analysis of the porous coordination polymer, a peak appears within a range of $2\theta$ of not less than 5 and not more than 10.

6. The method according to claim 4, wherein
the $Zn_4O$ cluster is not located at a center of the unit lattice the inside of which is empty.

7. A hydrogen storage device, comprising:
a sealed container; wherein
a porous coordination polymer is located in the sealed container;
the porous coordination polymer is formed of unit lattices;
each of the unit lattices has a shape of a cube having eight vertexes and twelve sides;
each of the vertexes of the unit lattices consists of a $Zn_4O$ cluster;
each of the sides of the unit lattices consists of a $^-OOC-C\equiv C-COO^-$ group; and
the inside of at least a part of the unit lattices is empty.

8. The hydrogen storage device according to claim 7, wherein
the sealed container further comprises an inlet.

* * * * *